(12) United States Patent
Zaitsev (10) Patent No.: US 9,147,073 B2
(45) Date of Patent: Sep. 29, 2015

(54) SYSTEM AND METHOD FOR AUTOMATIC GENERATION OF HEURISTIC ALGORITHMS FOR MALICIOUS OBJECT IDENTIFICATION

(71) Applicant: Oleg V. Zaitsev, Smolensk (RU)

(72) Inventor: Oleg V. Zaitsev, Smolensk (RU)

(73) Assignee: Kaspersky Lab, ZAO, Moscow (RU)

( * ) Notice: Subject to any disclaimer, the term of this patent is extended or adjusted under 35 U.S.C. 154(b) by 81 days.

(21) Appl. No.: 13/756,685

(22) Filed: Feb. 1, 2013

(65) Prior Publication Data
US 2014/0223566 A1    Aug. 7, 2014

(51) Int. Cl.
*G06F 21/00* (2013.01)
*G06F 21/56* (2013.01)

(52) U.S. Cl.
CPC ...... *G06F 21/567* (2013.01); *G06F 2221/2101* (2013.01)

(58) Field of Classification Search
None
See application file for complete search history.

(56) References Cited

U.S. PATENT DOCUMENTS

| 7,093,292 B1* | 8/2006 | Pantuso | 726/23 |
| 2011/0047618 A1* | 2/2011 | Evans et al. | 726/23 |
| 2011/0145920 A1* | 6/2011 | Mahaffey et al. | 726/22 |
| 2013/0124624 A1* | 5/2013 | Cathcart et al. | 709/204 |
| 2013/0340080 A1* | 12/2013 | Gostev et al. | 726/24 |

* cited by examiner

*Primary Examiner* — Brandon Hoffman
*Assistant Examiner* — Helai Salehi
(74) *Attorney, Agent, or Firm* — Bardmesser Law Group (57) ABSTRACT

A server-based system for generation of heuristic scripts for malware detection includes an automatic heuristics generation system for generating heuristic scripts for curing malware infections; a log database containing logs of events from user computers, including detection of known malicious objects and detection of suspicious objects; a safe objects database accessible containing signatures of known safe objects; a malicious objects database containing signatures of known malicious objects. The system retrieves suspect object metadata from the log database and generates the heuristic script based on data from the safe and malicious objects databases. For multiple computers having the same configuration and having the same logs, only one log common to all the multiple computers is transmitted and only one heuristic script is distributed to the multiple computers. A different and specific heuristic script is distributed to those computers that have a different log than the common log.

18 Claims, 3 Drawing Sheets

SYSTEM AND METHOD FOR AUTOMATIC GENERATION OF HEURISTIC ALGORITHMS FOR MALICIOUS OBJECT IDENTIFICATION

BACKGROUND OF THE INVENTION

1. Field of the Invention

The present invention is related to antimalware systems, and more particularly, to methods of generation and optimization of heuristic scenarios for detection of malicious applications and objects.

2. Description of the Related Art

At the present time, the incidence of malware continues to increase. Similarly, the damage caused by malware also continues to increase. Existing computer anti-virus and antimalware systems, particularly those found in corporate networks, primarily rely on identification and detection of known malware threats. However, new threats appear with increasing frequency, and therefore, the problem of detecting and identifying previously unknown threats becomes ever more urgent. With the growth of communication networks, such as the Internet, the need for data exchange, such as through email or file sharing, leads to an ever increasing incidence of infection of computer systems with viruses and other malicious objects.

A number of different types of malware exists, such as Trojans, worms, viruses, links that lead to webpages with malicious programs, vulnerabilities in licensed software and so on. Other examples include malicious applications that cause financial crimes (crimeware), spyware, ransomware, and so on. At the present time, the number of different malicious programs continues to grow, which is due to the fact that the number of personal computers connected to networks continues to grow. Also, there has been a dramatic growth in online services, which also attracts fraudsters and criminals.

At the same time, the capabilities of anti-virus software vendors—both in terms of the equipment available to process new threats, as well as in terms of human experts available to analyze the threats—is finite, and it is impractical to increase these capabilities at a rate commensurate with the increase in the threats.

As the number of new users of the Internet increases, the vulnerabilities due to such malware also increases. Also, as the number of various services available online such as internet banking, virtual money (e.g., webmoney), journals and blogs, online applications, such as Google apps, also leads to increased opportunities for fraudsters and malware creators to practice their art.

The current generation of spammers and hackers is highly skilled in exploiting vulnerabilities in the software, since most of these are professionals with a high degree of computer skills, particularly where it comes to organizing network attacks, extracting money or financial information from witting or unwitting victims. Their activity frequently touches upon not just the banking industry, but also fraud through a technique called Trojan-Ransom, and similar types of attacks. The success of such fraudsters and criminals is at least in part due to various factors such as insufficient protection level of many network based resources, weak or nonexistent laws on the subject of computer crime in many countries, and a lack of awareness or sufficient level of computer illiteracy in many people who utilize computers that are connected to the internet.

It should be noted that conventional methods of combating malware, such as viruses, worms, Trojans, and so on, typically use signatures and heuristic methodologies, and have, for all practical purposed, reached their limits at this time. The traditional signature analysis still permits to quickly and accurately identify a malicious application, but only if the malicious application is already known. The signatures themselves are constantly updated (at this time, this is frequently done on an hourly basis), which has one obvious drawback—such a protection mechanism gives the malware source a substantial amount of time to distribute malicious applications. From the time that the malicious application begins to be distributed, until the anti-virus vender receives it, analyzes, adds it to the signature database, tests a solution to it, and then publishes it on its server, many hours or sometimes days can pass. The problem is even more acute at times because not every step of the process can be automated, and some steps still require manual involvement by human experts.

Heuristic analysis is based on detection of certain features that are frequently characteristic of malicious software (such as specific code fragments, attempts to access registry keys, file names or processes), however, development and testing of each heuristic scenario is a time consuming process. Additionally, there is frequently a risk of false positives with this method. The effectiveness of such heuristic methods is rarely higher than 60-70% (i.e., the percentage of detection of unknown malware at the time of their first appearance).

In the event of infection of a computer by a malicious application, there are a number of known approaches to addressing the infection. Typically, such an approach is based on the anti-virus vendor's server sending certain information to the client computer. An example of such a solution using known templates is discussed in U.S. Pat. No. 7,346,928, which describes a system consisting of a server that receives requests from multiple clients for an anti-virus check of their files. Other known systems first generate a scenario for checking a computer for infection, and, based on the analysis of the infection, a cure solution is generated. U.S. Pat. No. 7,093,239 describes a system for analysis of a computer for the presence of malicious code. Such a system generates a template for behavior of each application, and then analyzes the applications for those with behavior whose characteristics match those of a malicious application. However, the conventional approach frequently overloads the network due to a large number of clients requesting resources from the server, and due to a large number of new applications that require analysis.

A review of the conventional techniques shows that existing techniques are not designed for a high rate of growth in the number of new applications, and, as a consequence, are unable to provide a satisfactory level of detection of malicious applications. A new approach to the use of heuristic algorithms is necessary that permits to increase the rate of detection of malicious applications by generating an optimizing new heuristic scenario of malware detection and identification.

Accordingly, there is a need in the art for a system and method for automated generation of heuristic scripted algorithms for more efficient malware detection.

SUMMARY OF THE INVENTION

The present invention is related to methods for anti-virus (AV) protection. The present invention provides a method, system and computer program product for dynamic generation of heuristic script algorithms for malware detection and cure that substantially obviates one or several of the disadvantages of the related art.

In one aspect of the invention, a server-based system for generation of heuristic scripts for malware detection includes an automatic heuristics generation system for generating heuristic scripts for curing malware infections; a log database containing logs of events from user computers, including detection of known malicious objects and detection of suspicious objects; a safe objects database accessible containing signatures of known safe objects; a malicious objects database containing signatures of known malicious objects. The system retrieves suspect object metadata from the log database and generates the heuristic script based on data from the safe and malicious objects databases. For multiple computers having the same configuration and having the same logs, only one log common to all the multiple computers is transmitted and only one heuristic script is distributed to the multiple computers. A different and specific heuristic script is distributed to those computers that have a different log than the common log.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The present invention, therefore, is directed to identifying as many malicious applications as possible by using heuristic methods, while keeping the level of false positives reasonably low, and without overloading the network communications channels with an excessive number of requests to the server of the anti-virus provider. It should be noted that at the current time, most software applications installed on a user's computer are legitimate, and, therefore, safe. Thus, it is necessary to accumulate statistical data regarding safe (i.e., verified) software applications, so that subsequently behavior that can be used to both include, and exclude, software as malicious, can be identified, using heuristic methods. On the other hand, it is necessary to have an approach that is close to 100% effective in identifying malicious software—in other words, the false negative rate should be close to zero, or zero.

Figure 1:
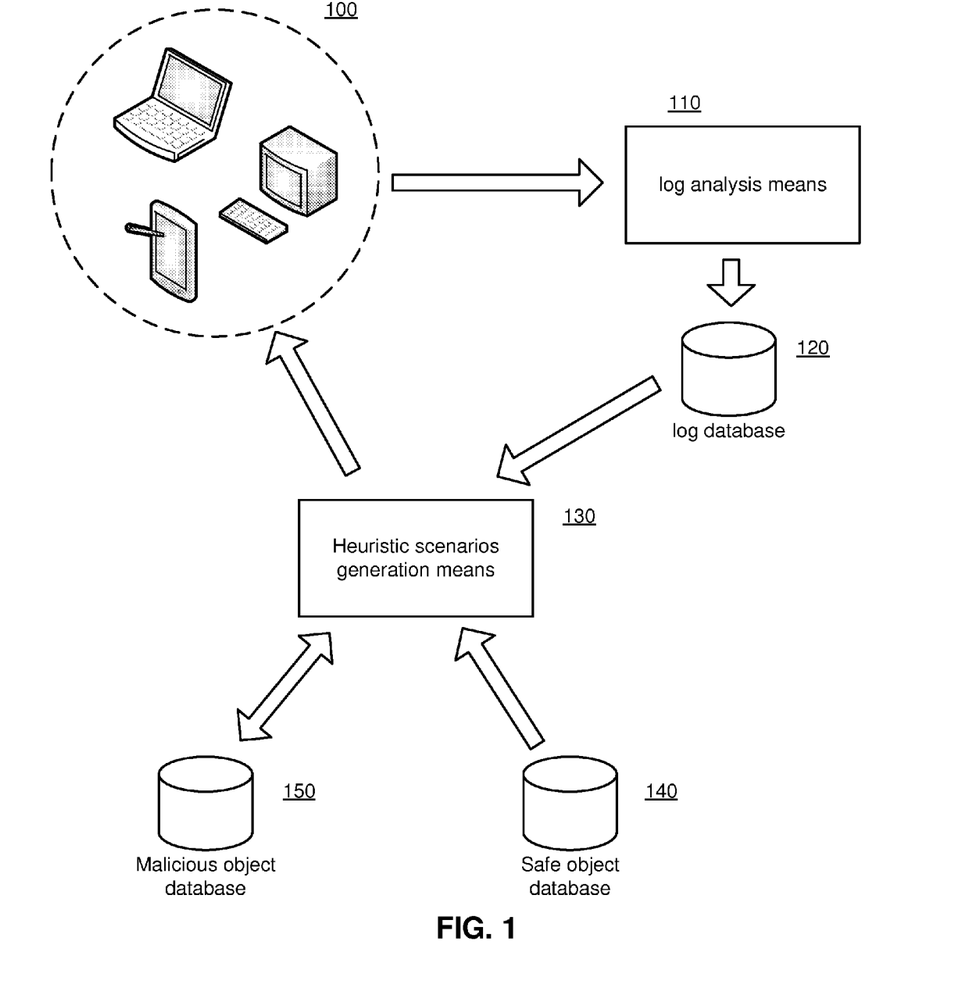
FIG. 1 illustrates a system for generation of heuristic algorithms, in accordance with the exemplary embodiment.

FIG. 1 illustrates a system for curing infections on a computer. To do this, a user computer 100, which might have a malicious application installed on it, has a check performed on it using an anti-virus means (not shown in the figure). This can be done using known analysis methods, for example, such as described in U.S. Pat. No. 7,540,030. As a result of this check, a journal (log) is generated, which records any information about identified or detected malicious software and the results of its operation.

In addition to the malicious software or application, the journal (log) can also contain records about unknown or suspicious applications, which showed activity in a specified period, where such activity is similar, but not necessarily identical, to the activity of malicious applications. Such activity may be termed "suspicious activity". Examples of such suspicious activity are silent installations of a component (i.e., without requesting user permission or feedback, and without displaying any information on the monitor), adding a file name to the list of files for auto launch when the operating system is loaded, writing or modifying files in system folders, attempts to exchange data with the antivirus driver, creation of a suspicious service or subscription, attempt to remove the antivirus software, modification of a context of any system process, halting a system process or attempting to do so, blocking registry editor (regedit), and so on. The verification means can generate a journal (log) at a particular moment and time, for example, in response to user requests, or periodically, as well as continuously update the journal (log) as system events occur and are detected by the verification means.

The journal (log) can also include such information as files that were created or modified, registry keys that were created or modified, network connection information, loaded libraries, such as DLLs, drivers, plug ins, operating system information, and so on. The information can be accessible with various level of detail, for example, in one embodiment, the data regarding the files can include only their hashes or control sums. Alternatively, the file data can also include metadata, for example, file name, time stamp of the last modification, time stamp of the linking, digital signature of the file, file type, file path, file attributes such as read only, archived, hidden, system, and so on.

As an example of suspicious activity, the following can be used: if the application Internet Explorer has an unknown instrument panel, and the control sum of the executable of Internet Explorer is different from the control sum of the standard Internet Explorer executable, and also it does not correspond to any entry in a database of safe software applications, then information about this version of Internet Explorer will be placed into the journal (log). However, the instrument panel may be a test version of a product of a third party vendor, which is not malicious at all, however, this determination requires additional analysis.

The journals received from the various computers 100 are collected by the log analysis means 110, which processes the data in the journals based on various parameters, such as type of the operating system installed on the computer 100, IP address of the computer 100 (optionally with the geographic region associated with the IP address), the time when the data was recorded in the journal (log), information about whether the user of the computer 100 has admin rights, any installed anti-virus software and how up to date its databases are, list of installed applications, list of launched services, list of installed drivers, list of installed OS updates, system and environment variables, list of active connections, and so on. The information collected from the journals can be used to form the most effective heuristic scenarios for detecting malware for users from specific regions, particularly in cases where some malware is either geographic region specific, or infect computers at least at first in a particular geographic region. The log database 120 stores all the information from the various journals that are collected by the journal analysis means 110.

The information from the journal database 120 is used by the heuristic scenario generation means 130, which creates the heuristic scenarios for detection of malicious software, which in turn will be used on the computers 100. In order to avoid a large number of false positives, and to increase the effectiveness of detection of malicious software, a settings/malicious objects database 150 that contains information for malware detection, including AV settings, is used, together with a safe objects database 140. These databases contain information about known malicious objects (in the malicious objects database 150), as well as about legitimate, i.e., safe, software (in the safe objects database 140).

The information stored in the databases includes file metadata (such as hash or control sums, size, name, type, version, etc.), as well as more detailed information about how a particular application functions—in other words, which files it creates or modifies on a disk, which registry keys it creates or modifies, which connections it makes and to which address, which system functions it calls (WinAPI), which libraries it loads (DLLs), what it modifies in other process (interprocess interaction), such as changing cookies in a browser, changes of variables in services and drivers, and so on. This data is compared with information in the journal (log), in order to both exclude those applications that are safe, and to detect malicious software through its activities and the consequences of its activities. The safe object database 140 is needed in order to exclude from the heuristic scenarios detection of objects that are, in fact, safe, and to thereby reduce the number of false positives.

The information regarding malicious software is updated by analysis of how the malicious software functions, or by emulating the malicious applications on test computers or virtual machines (such as Virtual PC or VMWare), with subsequent accumulation of all the changes in the operating system and data regarding the behavior of the application being studied. Information regarding safe software applications can also be collected in an analogous manner, as well as can be supplied by the vendors of the software itself (for example by Microsoft, Google, Adobe, etc.), or can be automatically collected from sites that distribute software or various updates to the software. Additionally, since for both malicious and safe software there can be certain behavioral characteristics, these in turn can be used to classify unknown applications and objects—both safe and malicious.

Based on the objects that are recorded in the malicious object database 150, the known methods of malware detection and identification can be modified. An example of such methods is disclosed in U.S. Pat. No. 7,530,106, which discusses associating a special danger rating to each process being executed. Based on a system of rules, each process is assigned a rating, and based on the rating certain restrictions will be placed on the process, based on HIPS policies. Based on the data collected from the journals, information associated with a particular malicious software can be identified, for example, the fact that this particular malicious software modifies specific system files. The danger rating for such malicious software can be set to 100% when the metadata coincides exactly with the metadata that were written in the rules (for example, for definitive identification, CLSID can be used). Identification of malicious software is typically done based on files and registry keys that need to be removed, quarantined, or restored to an earlier uninfected version (when the malicious software changed or modified important system objects).

The means for heuristic scenario generation 130 uses the journal database 120 to develop both general and specific scenarios. In the present case, the heuristic scenarios are modeled to detect both the malware that is definitively identified as malware, and similar (though not identical) objects that might appear in the future. The database 140 is used to exclude known clean objects, i.e., to prevent false positives. General scenarios can be used in the case of virus epidemics on a large number of computers that are infected by different modifications and/or versions of the same malicious software. Also, general scenarios can be used in corporate networks with many computers that have the same general operating system and application setup, and similar hardware. Specific scenarios may be used for detection and identification of malicious software on particular computer(s). For example, a corporate network with multiple computers of the same OS configuration and installed applications can use a general scenario, while a particular infected computer on the corporate network (with a different problem) might use a specific scenario (possibly in addition to the general scenario).

The following examples illustrate generation of both general and specific heuristic scenarios for malware detection. An example of a specific scenario for detecting a particular malicious software is as follows:

```
begin
    AddEvAlarmByCLSID('4E1075F4-EEC4-4A86-ADD7-
CD5F52858C31',AScriptName,'2020search.dll');
    AddEvAlarmByCLSID('FC2493D6-A673-49FE-A2EE-
EFE03E95C27C',AScriptName,'2020search.dll');
end.
```

In this case, the scenario was generated in the following manner:

1. A particular computer 100 quarantines a potentially malicious file "2020search.dll", after which information about the file is received in the journal analysis means 110, and after processing, the information stored in the journal database 120.

2. The malicious nature of the file is confirmed with statistics from other users (in other words, this is not the first time that this file is encountered on computers 100, and, at the same time, information about this file is not found in the safe object database 140).

3. The heuristic scenario generation means 130 identifies the characteristics of this particular file. In this case, these characteristics include the file name and its CLSID class.

4. The safe object database 140 is checked to insure that there is no false positives, i.e., that there is no such CLSID in the database 140.

5. After that, the scenario shown above is generated.

Such a scenario is a good fit for distributed malware which can be usually named and classified, in this case, through the use of a specific file name.

Specific scenarios can be generation using the unique object ID—for example, CLSID (stored in HKEY_CLASSES_ROOT\CLSID\), a hash or a control sum, a set of object metadata (such as file path, file name, size, version, etc.). Such scenarios are useful in that they do not trigger false positives, and in the case of unique malware permit a determination of malicious nature of the object with a high degree of confidence. If, in the future, variations of the same malware appear, then a more general scenario may be needed.

An example of a general heuristic scenario for detection of malware is as follows:

```
var
FPath : string;
procedure X(AName : string);
begin
    AddEvAlarmByName(FPath+AName, AScriptName, AName);
end;
begin
    FPath := NormalDir('%SysDisk%\');
    X('zpharaoh.exe');
    X('winstall.exe');
    X('md.exe');
    X('lsass.exe');
    ....
    X('luk1ylq.com');
end
```

In this example, the metadata is used for clusterization. The primary approach is as follows:

1. As a basis, one of the types of metadata is used, for example, the name of a file that is located in a particular folder, and a set of malicious object/files is selected, such that can be grouped together, for statistical purposes. If N files with similar metadata are identified, then this is a potential element for the scenario. Another factor is how well such a file can be used for the scenario. If the file is encountered very rarely, but is difficult to detect and is frequently missed during an analysis—then, there is a need for a new scenario to be generated.

2. A control check is performed, to see if legitimate files (i.e., safe objects) with the same metadata had been encountered, for example, checking for which system functions it calls (WinAPI), which libraries it loads (DLLs), what it modifies in other process (interprocess interaction), such as changing cookies in a browser, changes of variables in services and drivers, which connections it opens, whether it is signed, and by whom, how often it is launched, and on which computer, from where it is downloaded (e.g., from a trusted website, or not), which files it creates, modifies, deletes, etc. (e.g., hosts or autorun.inf, ini files in a system folder). The metadata can be static (one file only) or dynamic (based on a running process). If yes, then this type of metadata cannot be used easily for the scenario. In this situation additional metadata may be used, such as described above, or a decision may be taken that this particular variety of malware cannot be detected using metadata alone, without a risk of false positive. An example of this would be a malicious application that replaces a legitimate system file with itself.

Metadata that is frequently used in this case can be auto launch keys, CLSID, names of system services and drivers, and file names. In this example, the suspicion of md.exe can be thought of as "there are known cases when a personal computer that was infected in the root of the system disk had a file md.exe identified therein, which was missed by the anti-virus software, and which was identified as malicious after analysis. This is a common event, and there are no known clean objects or files with this name and path."

Another example using a different type of metadata—CLSID (class ID):

```
procedure CC(S : string);
begin
    AddEvAlarmByCLSID(S, AScriptName,'');
end;
begin
    CC('408BD6C-6563-4EA7-8656-9D55DD65A1A');
    CC('00000012-890E-4AAC-AFD9-EFF6954A34DD');
    CC('00000231-1000-0010-8000-00AA006D2EA4');
    CC('00000EF1-0786-4633-87C6-1AA7A44296DA');
    --- (350 more like this)
    CC('FFB51760-344E-4FFB-BFFF-4B18C7AC1D63');
    CC('FFF5092F-7172-4018-827B-FA5868FB0478');
    CC('FFFC57DB-1DE3-4303-B24D-CEE6DCDD3D86');
    CC('FFFFE708-B832-42F1-BAFF-247753B5E452');
end.
```

The source of the data for these scripts are the databases 120, 140 and 150. The databases contain some metadata that are encountered for both clean and malicious objects. The scenarios search through these metadata, to definitively identify a program as safe or malicious. Any information provided by the client computers 100 can be useful in these databases for both the generation of the scripts and for detecting false positives and taking further measures to reduce them.

As one example, consider a case with 10 different types of metadata. The less metadata is used for the scenario generation, the higher the probability that the scenario can identify all subsequent versions of the malware, but, at the same time, the higher the probability of false positives—which in turn forces the use of more metadata, to reduce the risk of false positives. With more metadata, the probability of false positives is lower, but, so is the probability of detection of new variants of malware. The general concept is to use as little metadata as possible taking the risk of false positives into consideration, but to try to use metadata that is only specific to malicious objects, rather than clean ones.

Another example deals with detection of ActiveSetup entries in the registry, which some malicious objects use as a form of auto launch:

```
procedure CA(S : string);
var
    Tmp : string;
begin
    Tmp := RegKeyStrParamRead('HKLM', 'Software\Microsoft\Active Setup\Installed Components\'+S, 'StubPath');
    if Tmp<> '' then
    AddEvAlarmByName(Tmp, AScriptName, ExtractFileName(Tmp));
end;
begin
    CA('198BCB9E-A95B-45FF-A89D-5FC22623446C');
    CA('B38B32A2-D4EB-A6D8-14AB-38ACD8369E3E');
    CA('QPYMQQFS');
    CA('{007C0E62-16F7-14AD-4EFB-405E87659967}');
    ...
```

```
CA('{H9112RB03-AB-B70-7-11D2-9CBD-0000FS7AH6-9E2121BHJLK}');
...
end
```

After the heuristic scenarios for detection of malware are generated, they are transmitted to the computers 100, are executed, and the results of their execution can be verified in accordance with lists of known malicious software (blacklists) and safe software (whitelist), in order to verify that the heuristic scenarios execute correctly. Where the scenarios are generated correctly, their execution will permit curing the computers 100 of all the malicious software, without affecting safe software. However, this is an ideal case, which is rarely achieved in practice due to the following reasons:

1. New malicious objects appear constantly;
2. New safe software appears constantly, and existing safe software is constantly updated;
3. As a rule, heuristic methods of detection of malware do not provide for 100% certainty of detection of unknown malicious objects without at least some level of false positives.

To address this problem, constant work is required to improve and update heuristic scenarios of malware detection. However, given the finite capacity of communication channels, these communication channels can be overloaded with constant transmissions of journals and heuristic scenarios, which is a particularly relevant problem where a large number of computers 100 is involved. To address this problem, the following steps can be taken:

1. The full journal (log) is received from the computer 100 only the first time, following that, only information regarding any false positives and unknown suspicious software applications is transmitted, where the false positives and the unknowns are due to the heuristic detection scenarios;
2. In a corporate network, it is possible to send the journals not from every computer that has the same configuration, but only from a single instance, if the journals themselves are identical. The administration server can perform the comparison. The admin server can store the information about the fact that two different computers used the same flash drive, and afterwards, both machines had suspicious activity. When other criteria are the same (same OS, same list of installed applications, same list of system services, drivers, etc.), it is reasonable to conclude that the log/journal from only one of these machines is sufficient.
3. Instead of sending full heuristic scenarios every time (which can be hundreds of kilobytes, particularly if a script interpreter also needs to be included), only the deltas, or differences in the scenarios, are sent.

Figure 2:
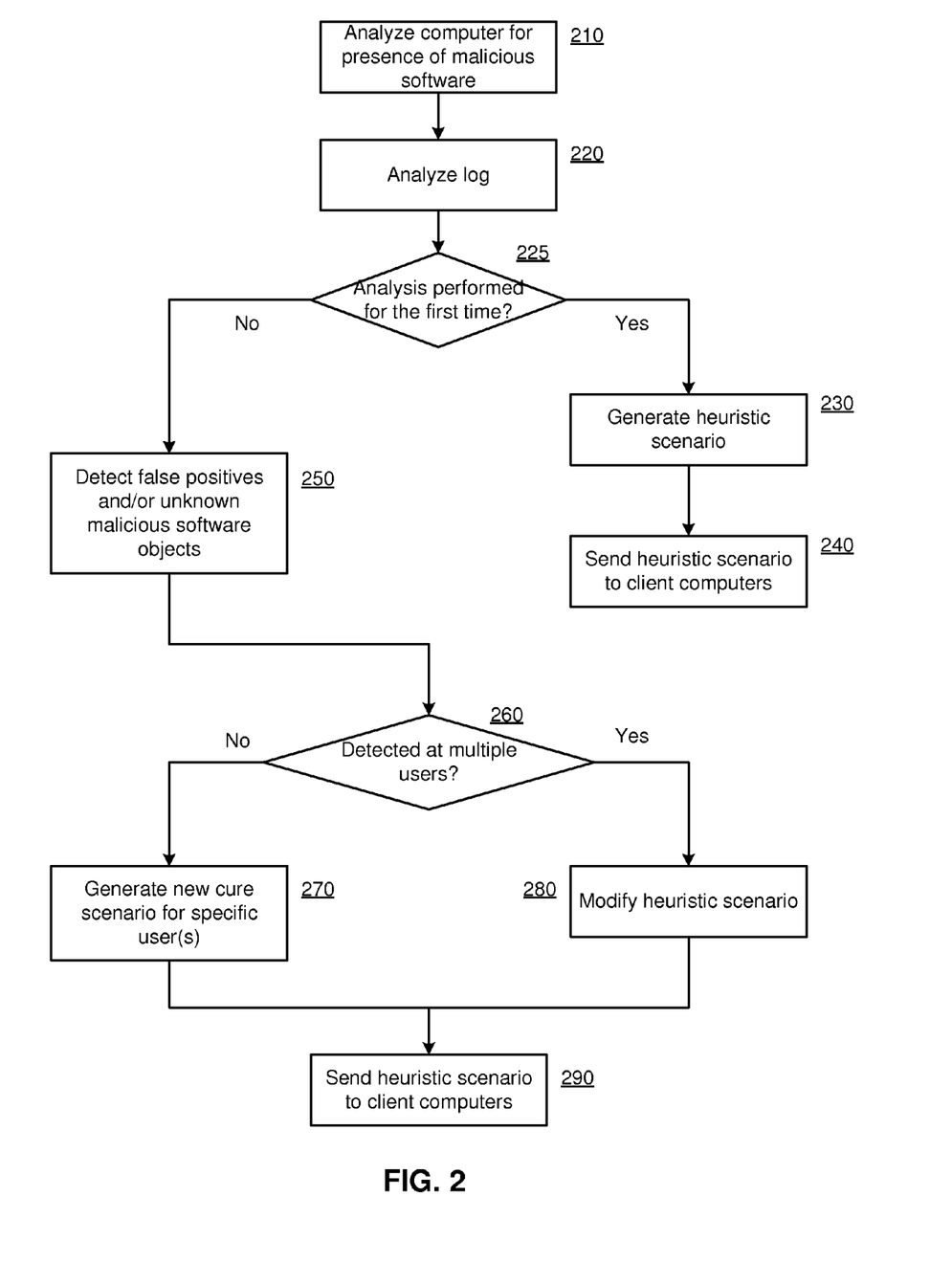
FIG. 2 illustrates a block diagram of a method for automatic generation of heuristic algorithms, in accordance with the exemplary embodiment.

FIG. 2 illustrates the method according to one embodiment of the present invention. As shown in FIG. 2, in step 210, the computer 100 is analyzed for the presence of malicious objects and/or applications, the journal is formed, and the journal is then sent to the journal analysis means 110. In step 220, the journal analysis means 110 analyzes the journal, and writes the results of the analysis in to the journal database 120. In step 225, the algorithm checks if this is the first time that the analysis is performed (or not). If it is the first time, then, in step 230, a heuristic detection scenario is generated, with the help of the heuristic scenario generation means 130. In one embodiment, the heuristic scenario is generated based on multiple journals, which permits generation of a more generic detection scenario, which is applicable to multiple computers, and will permit detection and removal of malware from multiple computers. Also, in one embodiment, in step 230, a previously generated heuristic scenario can be selected, which was generated earlier based on journals received from other computers 100. In step 240, the heuristic scenario is sent to the computer 100, and is then executed on the computer 100.

If, in step 225, it turns out that the analysis has been performed previously, then, in step 250, an analysis for false positives and/or unknown malicious software application is performed, which might be present on the computer 100. Then, in step 260, the process checks if there were similar false positives and/or similar unknown malicious software detected for other users of other computers. In different embodiments, the various users can be drawn from different pools—for example, for a relatively small number of computers for example, 10 or 20, this may be a case where any number larger than one is sufficient, however, where the number of computers at issue is much larger, for example, a large corporate network with hundreds or thousands of computers, or even larger networks, involving millions of computers, then this would need to involve tens or perhaps hundreds of computers with similar problems. If the algorithm decides that false positives and/or unknown malicious software was detected on a relatively small number of computers, then, in step 270, a new heuristic scenario is generated. Otherwise, in step 280, an existing heuristic scenario can be modified or adapted. The example in step 270 describes a scenario for curing a specific targeting threat, since in this case, such a scenario will not likely be useful anywhere else. Similarly, a newly identified malware might not have a generalized scenario, given a high risk of false positives.

In step 290, the heuristic scenario is sent to the computer 100, and is then executed on the computer 100. As noted earlier, subsequent transmissions of heuristic scenarios to the computer 100 may be performed either fully, or in an incremental or difference mode.

Figure 3:
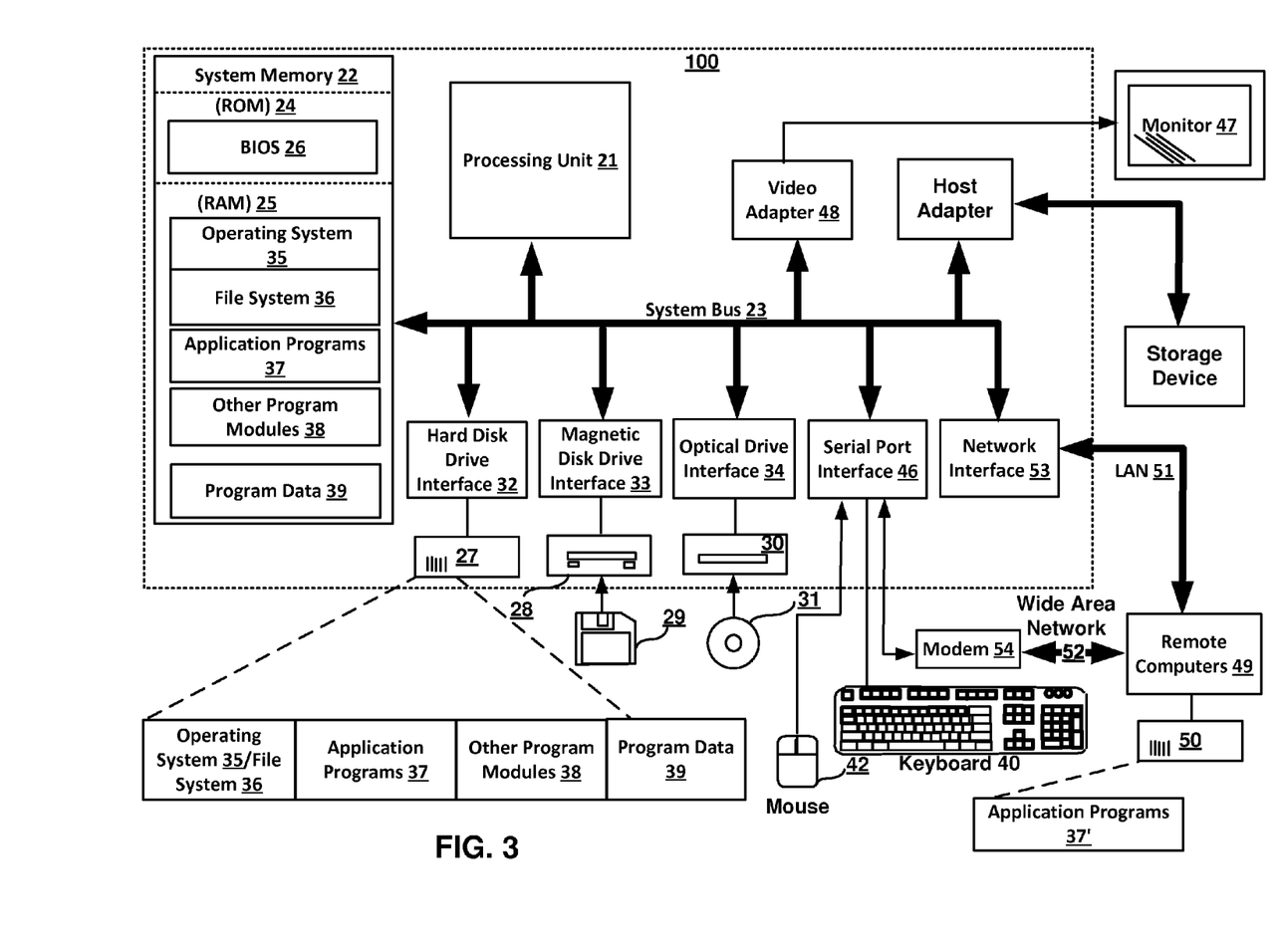
FIG. 3 illustrates a schematic of an exemplary computer system that can be used for implementation of the invention.

With reference to FIG. 3, an exemplary system for implementing the invention includes a general purpose computing device in the form of a computer 100 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 100, such as during start-up, is stored in ROM 24.

The computer 100 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 100.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 100 includes a file system 36 associated with or included within the operating system 35, one or more application programs 37, other program modules 38 and program data 39. A user may enter commands and information into the computer 100 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 100 may operate in a networked environment using logical connections to one or more remote computers 49. The remote computer (or computers) 49 may be another computer, a server, a router, a network PC, a peer device or other common network node, and typically includes many or all of the elements described above relative to the computer 100, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 100 is connected to the local network 51 through a network interface or adapter 53. When used in a WAN networking environment, the computer 100 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 100, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for automatic generation of the heuristic scripts used for malware detection.

It should also be appreciated that various modifications, adaptations and alternative embodiments thereof may be made within the scope and spirit of the present invention. The invention is further defined by the following claims.

What is claimed is:

1. A computer-implemented system for automatic generation of a heuristic script for malware detection, the system comprising:
    a server-based automatic heuristics generation system for generating heuristic scripts for curing malware infections on a user computer;
    a log database connected to the automatic heuristics generation system and containing logs of events that occurred on user computers, the events including detection of known malicious objects and detection of suspicious objects;
    a safe objects database accessible by the automatic heuristics generation system and containing properties of known safe objects; and
    a malicious objects database accessible by the automatic heuristics generation system and containing signatures of known malicious objects,
    wherein the automatic heuristics generation system retrieves suspect object metadata from the log database and generates the heuristic script based on data from the safe objects database and the malicious objects database and based on logs from multiple computers,
    wherein a full log is received from a particular computer only the first time, and subsequently only information regarding any false positives and unknown suspicious software applications is received,
    wherein the object metadata is used for clusterization to improve identification of only malicious objects and to reduce false positive identification of non-malicious objects,
    wherein, for multiple computers having the same configuration and connected to the same network and having the same logs, only one log that is common to all the multiple computers is transmitted to the log database and only one heuristic script is generated and distributed to the multiple computers, and
    a different and specific heuristic script is distributed to those computers that have a different log than the common log.

2. The system of claim 1, wherein the distributed heuristic script includes a script interpreter.

3. The system of claim 1, wherein the distributed heuristic script represents a difference from a prior script.

4. The system of claim 1, wherein the distributed heuristic script is based on any of type of the operating system installed on the multiple computers, a time when the data was recorded in the log, administrative rights of users of the multiple computers, installed anti-virus software, time of last update of anti-virus databases.

5. The system of claim 1, wherein the log includes any of: silent installation of a component, adding a file name to a list of files for auto launch, and writing or modifying a file in a system folder.

6. The system of claim 1, wherein the logs are generated in response to user requests.

7. The system of claim 1, wherein the logs are generated periodically.

8. The system of claim 1, wherein the logs include information about any of registry keys that were created or modified, loaded libraries, loaded or modified drivers, installed plug ins, and operating system information.

9. The system of claim 1, wherein the properties include object signatures.

10. The system of claim 1, wherein the properties include object metadata.

11. A computer-implemented method for automatic generation of a heuristic script for malware detection, the method comprising:

storing logs of events that occurred on user computers in a log database, the events including detection of known malicious objects and detection of suspicious objects;

storing properties of known safe objects in a safe objects database;

storing signatures of known malicious objects in a malicious objects database;

retrieving suspect object metadata from the log database;

on a server, generating heuristic scripts for curing malware infections based on data from the safe objects database and the malicious objects database and based on logs from multiple computers, wherein a full log is received from a particular computer only the first time, and subsequently only information regarding any false positives and unknown suspicious software applications is received, wherein the object metadata is used for clusterization to improve identification of only malicious objects and to reduce false positive identification of non-malicious objects, wherein, for multiple computers having the same configuration and connected to the same network and having the same logs, only one log that is common to all the multiple computers is transmitted to the log database from user computers and only one heuristic script is generated and distributed to the multiple computers; and distributing a different and specific heuristic script to those computers that have a different log than the common log.

12. The method of claim 11, wherein the distributed heuristic script includes a script interpreter.

13. The method of claim 11, wherein the distributed heuristic script represents a difference from a prior script.

14. The method of claim 11, wherein the distributed heuristic script is based on any of type of the operating system installed on the multiple computers, IP addresses of the multiple computers, a time when the data was recorded in the log, administrative rights of users of the multiple computers, installed anti-virus software, time of last update of anti-virus databases.

15. The method of claim 11, wherein the log includes any of: silent installation of a component, adding a file name to a list of files for auto launch, and writing or modifying a file in a system folder.

16. The method of claim 11, wherein the logs are generated in response to user requests.

17. The method of claim 11, wherein the logs are generated periodically.

18. The method of claim 11, wherein the logs include information about any of files that were created or modified, registry keys that were created or modified, network connection information, loaded libraries, loaded or modified drivers, installed plug ins, and operating system information.

* * * * *